(12) United States Patent
Okazaki (10) Patent No.: US 9,822,914 B2
(45) Date of Patent: Nov. 21, 2017

(54) PIPE CONNECTING CONNECTOR

(75) Inventor: Tsuyoshi Okazaki, Yokohama (JP)

(73) Assignee: NIFCO INC., Yokohama-Shi, Kanagawa-Ken (JP)

( * ) Notice: Subject to any disclaimer, the term of this patent is extended or adjusted under 35 U.S.C. 154(b) by 854 days.

(21) Appl. No.: 13/806,900

(22) PCT Filed: Jun. 17, 2011

(86) PCT No.: PCT/JP2011/003482
§ 371 (c)(1),
(2), (4) Date: Feb. 14, 2013

(87) PCT Pub. No.: WO2012/001903
PCT Pub. Date: Jan. 5, 2012

(65) Prior Publication Data
US 2013/0221665 A1 Aug. 29, 2013

(30) Foreign Application Priority Data

Jun. 28, 2010 (JP) .................................. 2010-145947

(51) Int. Cl.
*F16L 37/12* (2006.01)
*F16L 37/098* (2006.01)
*F16L 37/14* (2006.01)

(52) U.S. Cl.
CPC .......... *F16L 37/12* (2013.01); *F16L 37/0985* (2013.01); *F16L 37/144* (2013.01)

(58) Field of Classification Search
USPC ............... 285/305, 319, 921, 308, 313, 321
See application file for complete search history.

(56) References Cited

U.S. PATENT DOCUMENTS 4,660,803 A * 4/1987 Johnston ............. F16L 37/0985
137/533.17
5,284,369 A 2/1994 Kitamura
(Continued)

FOREIGN PATENT DOCUMENTS

JP H08-6867 B2 1/1996
JP H10-512355 A 11/1998
(Continued)

OTHER PUBLICATIONS

PCT, "International Search Report for PCT/JP2011/003482", dated Jul. 26, 2011.

*Primary Examiner* — Aaron Dunwoody
*Assistant Examiner* — Fannie Kee
(74) *Attorney, Agent, or Firm* — Manabu Kanesaka (57) ABSTRACT

A pipe connecting connector adapted to connect a pipe to a connecting object, includes a connector main body adapted to insert or remove the pipe, and including a locking opening formed on a side portion thereof; a lock member including an annular portion and a pipe locking portion extending from the annular portion and including a locking claw extending inside the connector main body through the locking opening for locking the pipe, the lock member being movably held relative to the connector main body between a locking position wherein the pipe locking portion locks the pipe, and an unlocking position releasing the locking, and an urging device urging the lock member to a locking position side. The pipe locking portion is urged in a locking direction of the pipe by an urging force of the urging device when the lock member is in the locking position.

11 Claims, 11 Drawing Sheets

(56) References Cited

U.S. PATENT DOCUMENTS

| | | | |
|---|---|---|---|
| 5,941,577 A | 8/1999 | Musellec | |
| 6,152,496 A | 11/2000 | Kouda | |
| 6,328,344 B1* | 12/2001 | Tozaki | F16L 37/0985 285/120.1 |
| 7,494,156 B2* | 2/2009 | Okada | F16L 37/0987 285/319 |
| 2003/0218335 A1* | 11/2003 | Takayanagi | F16L 37/0987 285/319 |
| 2008/0224469 A1 | 9/2008 | Ostergren et al. | |
| 2010/0052313 A1* | 3/2010 | Ishida | F16L 37/088 285/93 |
| 2010/0078934 A1* | 4/2010 | Matsunaga | F16L 37/0987 285/316 |

FOREIGN PATENT DOCUMENTS

| | | | |
|---|---|---|---|
| JP | 3107085 | B2 | 9/2000 |
| JP | 3319712 | B2 | 9/2002 |
| JP | 3494581 | B2 | 2/2004 |
| JP | 2009-270606 | A | 11/2009 |

\* cited by examiner

PIPE CONNECTING CONNECTOR

RELATED APPLICATIONS

The present application is National Phase of International Application No. PCT/JP2011/003482 filed Jun. 17, 2011, and claims priority from Japanese Application No. 2010-145947 filed Jun. 28, 2010.

FIELD OF TECHNOLOGY

The present invention relates to a pipe connecting connector which connects a pipe to a connecting object.

BACKGROUND ART

Conventionally, as for this type of a pipe connecting connector, there is known a pipe connecting connector comprising a connector main body wherein the pipe is inserted and removed; and a lock member slidably held in the connector main body, and fixing the inserted pipe. In the lock member, there is formed a holding arm held inside a hole opening on a peripheral face of the connector main body, and including a hook which can be displaced in a radial direction of the connector. The hook includes an inclined surface on an outer side in a radial direction of an end thereof. When the lock member moves in a direction of fixing the pipe, the hook engages with a bulge portion of the pipe and fixes the pipe. Also, the inclined surface thereof is pressed by a peripheral edge of the hole of the connector main body, so that a movement in the radial direction thereof is controlled (see Patent Document 1).

Also, in the conventional connector, when a release arm, which has been connected to a back end side of the holding arm, is pressed, the lock member moves in a direction of releasing a fixation of the pipe. Thereby, a pressing force relative to the inclined surface of the hook is released, and the hook can move to the outer side in the radial direction (a direction of being capable of releasing a connection of the pipe).

PRIOR ART DOCUMENT

Patent Document

Patent Document 1: Japanese Patent No. 3107085

SUMMARY OF THE INVENTION

Problems to be Solved by the Invention

In the aforementioned conventional technology, however, when a force in a pull-out direction acts on the pipe connected to the connector, the lock member moves in the direction of fixing the pipe, and a pressing force relative to the inclined surface of the hook increases, so that the pipe can be stably fixed. However, there has been a possibility that when a force in the direction of releasing the fixation of the pipe acts relative to the lock member, an engagement of the hook relative to the bulge portion of the pipe might be released without any relation to a usual releasing operation by a user.

The present invention has been made in view of the problem of the aforementioned conventional technology, and an object thereof is to provide a pipe connecting connector capable of solidly holding a connected state between the pipe.

Means for Solving the Problems

According to the first aspect of the present invention made in order to solve the aforementioned problem, a pipe connecting connector (1) is for connecting a pipe (2) to a connecting object, and comprises a connector main body (3) wherein the pipe is inserted and removed; a lock member (4) including a pipe locking portion (23), which locks the pipe, and held relative to the connector main body to be capable of moving between a locking position wherein the pipe locking portion locks the pipe, and an unlocking position which releases the locking; and an urging device (33 and 41) urging the lock member to the locking position side. In a case wherein the lock member is in the locking position, the pipe locking portion is urged in a direction of locking the pipe by an urging force of the urging device.

Also, according to a second aspect of the present invention, with respect to the aforementioned first aspect, in the connector main body and the lock member, on one side, there is formed a guide face (28b and 57a), and on the other side, there is formed a slidingly-contacting portion (26a and 51) which slidingly contacts with the guide face when the lock member moves. The slidingly-contacting portion moves on the guide face by the urging force of the urging device, so that the pipe locking portion is guided in the direction of locking the pipe.

Also, according to a third aspect of the present invention, with respect to the aforementioned second aspect, the urging device is provided in one of either the connector main body or the lock member, and is made by an elastic urging piece (33) which elastically deforms by abutting against the other thereof so as to produce the urging force.

Also, according to a fourth aspect of the present invention, with respect to the aforementioned second aspect, due to an engagement with the connector main body, the pipe locking portion is provided to be capable of elastically deforming, and one of either the slidingly-contacting portion (26a) or the guide face (28b) is provided in the pipe locking portion.

Also, according to a fifth aspect of the present invention, with respect to the aforementioned third aspect, the slidingly-contacting portion (51) is formed in the elastic urging piece.

Effect of the Invention

According to the first aspect of the present invention, the pipe locking portion is urged in a locking direction of the pipe in the case wherein the lock member is in the locking position so as to be capable of solidly holding a connected state to the pipe.

Also, according to the second aspect of the present invention, the urging force of the urging device relative to the lock member can be easily converted to a force displacing the pipe locking portion in the locking direction of the pipe, so that in spite of a simplified and compact structure, the connected state to the pipe can be solidly held.

Also, according to the third aspect of the present invention, in spite of the simplified structure having a little component count, using the urging force relative to the lock member, the connected state to the pipe can be solidly held.

Also, according to the fourth and fifth aspects of the present invention, in spite of the simplified and compact structure, using the urging force relative to the lock member, the connected state to the pipe can be stably held.

BEST MODES OF CARRYING OUT THE INVENTION

<First Embodiment>

Hereinafter, with reference to FIG. 1 to FIG. 8, a pipe connecting connector according to the first embodiment of the present invention will be explained. Hereinafter, unless otherwise specially indicated, directions regarding the pipe connecting connector and a pipe will be determined according to directions shown by arrows in FIG. 1.

Figure 1:
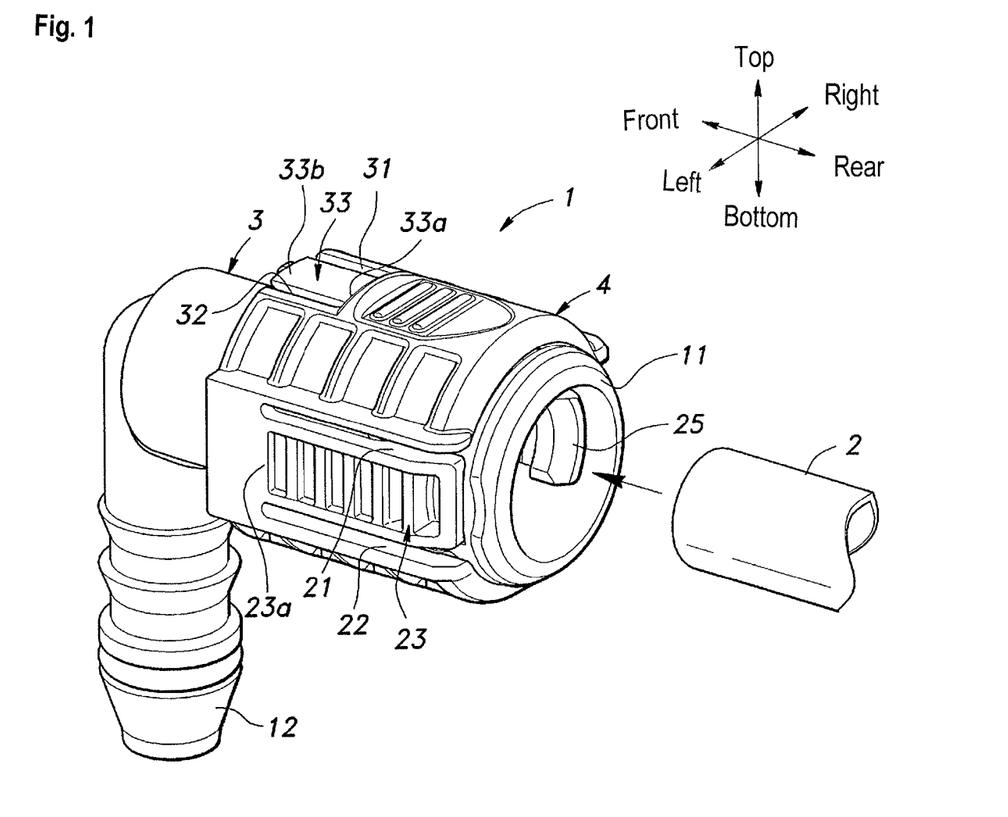
FIG. 1 is a perspective view of a pipe connecting connector according to the first embodiment.

As shown in FIG. 1, a pipe connecting connector (hereinafter, simply called a connector) 1 is used for connecting a pipe 2 for a fluid transport to a connecting object (here, a hose for the fluid transport which is not shown in the figure), and is structured mainly by a connector main body 3 wherein the pipe 2 is inserted and removed; and a lock member 4 held by the connector main body 3 movably in a front-back direction, and carrying out a fixation and a release of the pipe 2 according to a front-back movement thereof.

Figure 2:
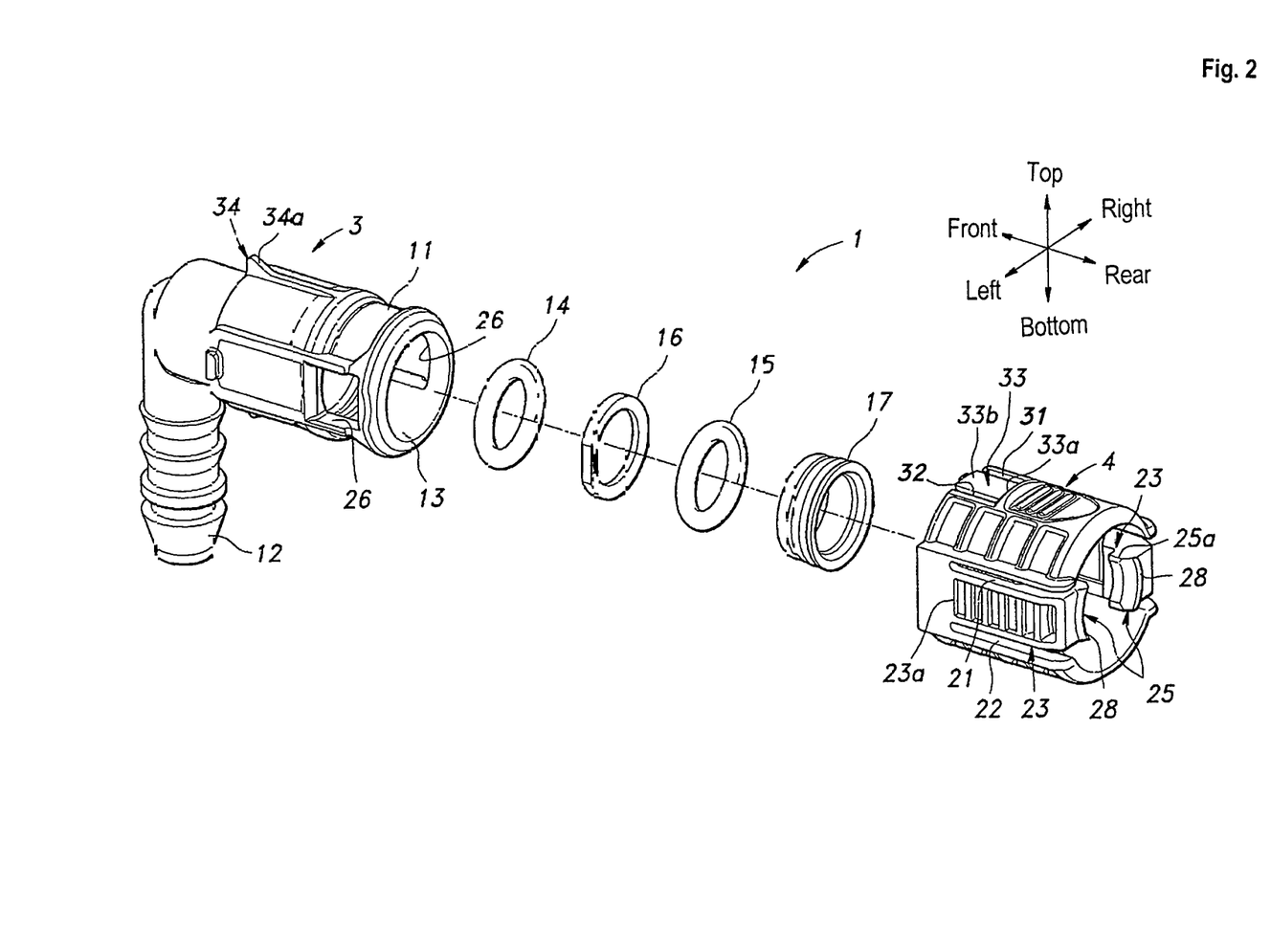
FIG. 2 is an exploded perspective view of the pipe connecting connector in FIG. 1.

The connector main body 3 is made of a synthetic resin material. As shown in FIG. 2, the connector main body 3 comprises a cylindrical pipe insertion portion 11 in which the lock member 4 is attached to an outer periphery; and a hose connecting portion 12 provided to extend downwardly from a front end of the pipe insertion portion 11. In the hose connecting portion 12, there is connected the hose for the fluid transport which becomes the connecting object of the pipe 2. The pipe insertion portion 11 has a symmetric shape in a top and bottom and in a right and left. Inside an insertion hole 13 in which the pipe 2 is inserted, there are attached two O-rings 14 and 15; a spacer 16; and a bush 17, for sealing a flow channel tightly.

The lock member 4 is an approximately cylindrical member made of a synthetic resin material, and has a symmetric shape in a top and bottom and in a right and left. In the right and left of the lock member 4, there are respectively provided elastic locking pieces 23 demarcated by upper and lower slits 21 and 22 provided to extend forward from a back end thereof. In free ends of the elastic locking pieces 23, there are provided to protrude locking claws 25 toward an inner side in a radial direction of the lock member 4. Also, the elastic locking pieces 23 can elastically deform in a right-and-left direction in such a way as to displace the locking claws 25 in the radial direction of the lock member 4 as a supporting point of base end portions 23a in front.

The locking claws 25 are inserted into right-and-left locking openings 26 of the connector main body 3 from an outside so as to be capable of engaging relative to the pipe 2. Although details will be explained hereinafter, on an outer periphery of the pipe 2, there is provided to protrude a flange-like bulge portion 27 (see FIG. 5) along a circumferential direction thereof. The bulge portion 27 is locked by the locking claws 25 when the pipe 2 is connected to the connector 1. Also, the locking claws 25 include protruding portions 28 forming an approximately triangle-shaped cross-sectional surface which are provided to protrude backward from main body portions 25a thereof provided to protrude to the inner side in the radial direction.

Also, in the top and bottom of the lock member 4, there are respectively provided elastic urging pieces 33 demarcated by right and left slits 31 and 32 provided to extend to a back from a front end thereof. The elastic urging pieces 33 can elastically deform in an up-and-down direction in such a way as to displace free end portions 33b in the radial direction of the locking member 4 as a supporting point of base end portions 33a in a back. Although details will be explained hereinafter, in the front end of the pipe insertion portion 11 of the connector main body 3, there is provided a protruding piece 34 protruding in the radial direction in a position corresponding to the elastic urging pieces 33.

Next, with reference to FIG. 3 to FIG. 7, a connecting movement of the connector 1 with the aforementioned structure and the pipe 2 will be explained.

Figure 3:
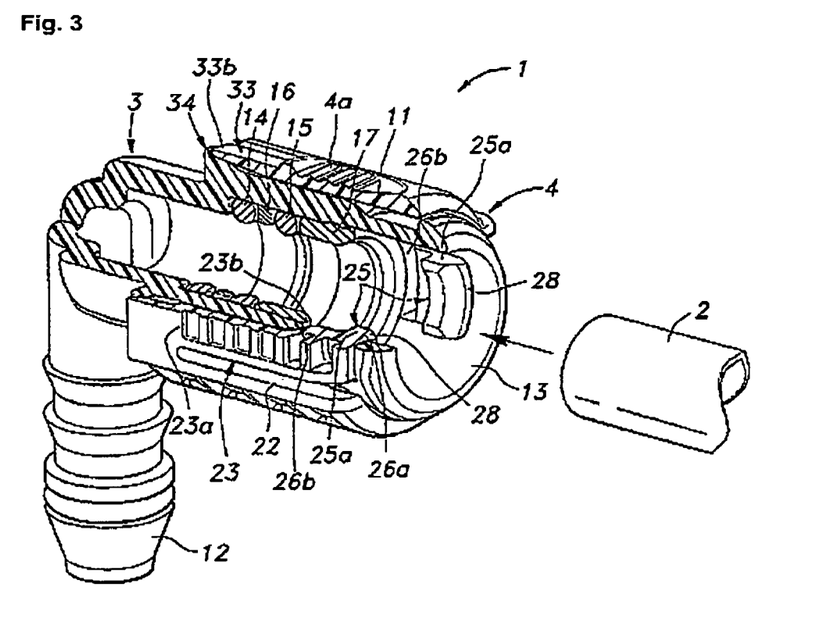
FIG. 3 is a partially cross-sectional perspective view showing one state (before a connection) in a connecting movement of the pipe connecting connector in FIG. 1.

As shown in FIG. 3, in the connector 1 before the pipe 2 is connected, the lock member 4 is in an initial position. Also, the elastic locking piece 23 is in an initial state which is not deformed. At that time, in the elastic urging piece 33, the free end portion 33b runs on an inclined back surface 34a (see FIG. 2) of the protruding piece 34 of the connector main body 3, so that the elastic urging piece 33 is in a state of being elastically deformed to an outer side in the radial direction. The lock member 4 is in a state of being urged backward by an elastic restoring force (an urging force) of the elastic urging piece 33. Also, the locking claw 25 abuts against an angle portion on an inner side in a back edge 26a of the locking opening of the connector main body 3, and the protruding portion 28 is locked in the back edge 26a so as to control a displacement of the elastic locking piece 23 to the outer side in the radial direction.

Figure 4:
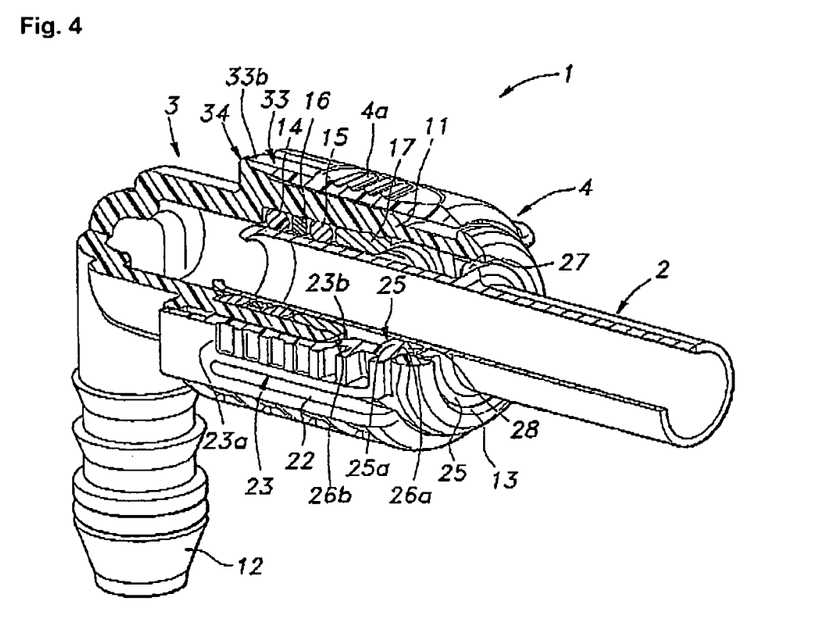
FIG. 4 is a partially cross-sectional perspective view showing one state (in a middle of the connection) in the connecting movement of the pipe connecting connector in FIG. 1.

Next, when a user inserts the pipe 2 into the insertion hole 13 of the connector main body 3 up to a predetermined position, as shown in FIG. 4, the bulge portion 27 abuts against the locking claw 25. Then, the user further pushes the pipe 2 forward, so that the lock member 4 moves forward against the urging force of the elastic urging piece 33. Thereby, the locking claw 25 is separated from the back edge 26a of the locking opening 26, and locking of the protruding portion 28 is also released. At that time, the bulge portion 27 of the pipe moves forward in a state of slidingly contacting with an inclined surface 28a (see FIG. 6) on an inner side of the protruding portion 28, so that the locking claw 25 climbs over the bulge portion 27 while being displaced to the outer side in the radial direction, and moves to a back thereof.

Figure 5:
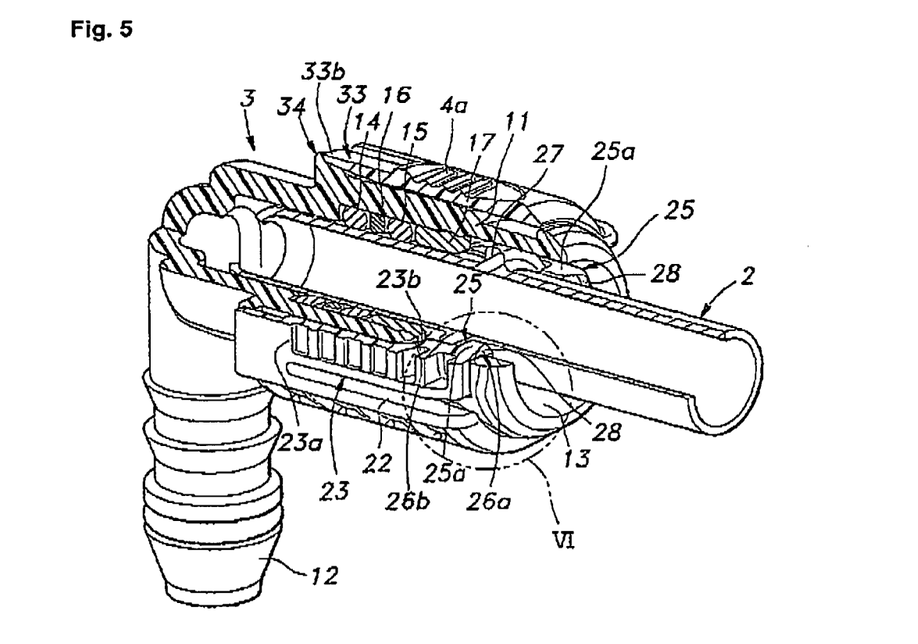
FIG. 5 is a partially cross-sectional perspective view showing one state (after a completion of the connection) in the connecting movement of the pipe connecting connector in FIG. 1.
Figure 6:
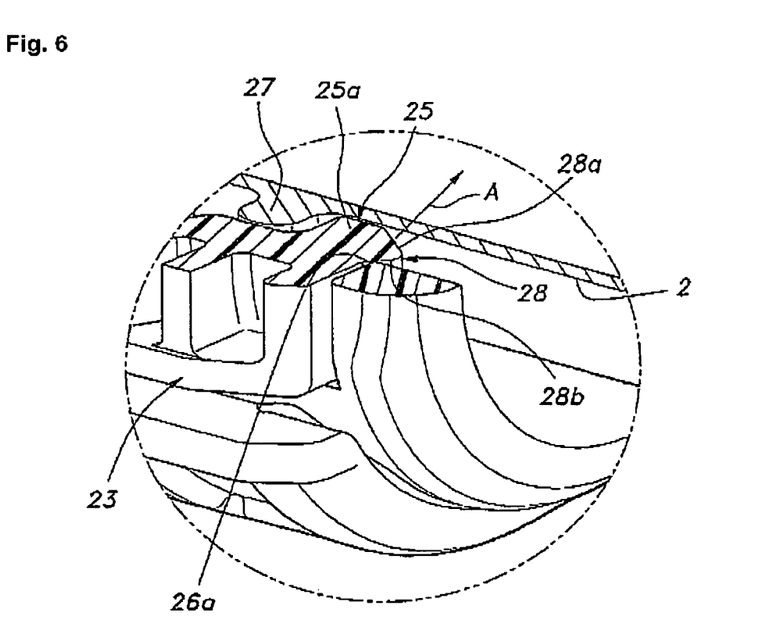
FIG. 6 is an enlarged view of portion VI in FIG. 5.

Thereby, as shown in FIG. 5, the lock member 4 returns to a locking position (the same position as the above-mentioned initial position), and the bulge portion 27 of the pipe 2 is locked by the locking claw 25, so that a connection of the pipe 2 relative to the connector 1 is completed. At that time, as shown in FIG. 6, the back edge 26a of the locking opening 26 is in a state wherein the angle portion on the inner side thereof has slidingly contacted with an inclined surface 28b on an outer side of the protruding portion 28. The inclined surface 28b inclines relative to an insertion direction (the front-back direction) of the pipe 2 in such a way as to head for the inner side in the radial direction from the outer side in the radial direction as the inclined surface 28b goes backward further. Thereby, the urging force of the elastic urging piece 33, which acts in such a way as to move the lock member 4 backward, is converted to a force displacing the locking claw 25 to the inner side in the radial direction (i.e., a direction of locking the pipe 2) shown by an arrow A. As a result, the locking claw 25 is urged in such a way that the protruding portion 28 thereof enters into a front inner side of the back edge 26a of the locking opening 26. Namely, locking of the locking claw 25 relative to the bulge portion 27 is solidly held.

Incidentally, a structure for converting the urging force of the elastic urging piece 33 to the force displacing the locking claw 25 in the direction of locking the pipe 2 is not limited to the aforementioned structure. For example, an inclined surface, which functions as is the case with the inclined surface 28b, may be provided on a connector main body 3 side. Also, a portion, which functions as is the case with the back edge 26a of the locking opening 26, may be provided on an elastic locking piece 23 side.

Figure 7:
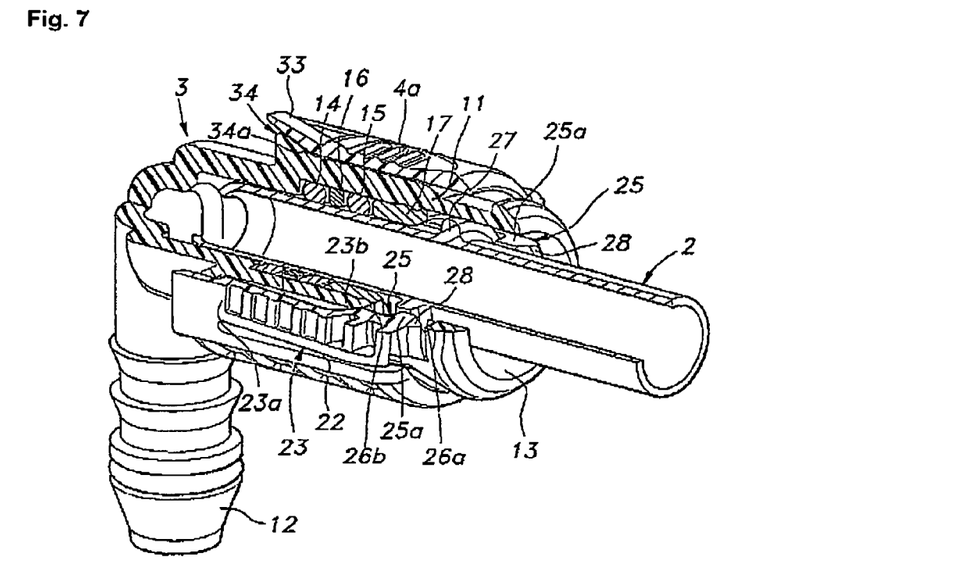
FIG. 7 is a partially cross-sectional perspective view showing a connection-releasing movement of the pipe connecting connector in FIG. 1.

On the other hand, when a connected state of the pipe 2 relative to the connector 1 is released, as shown in FIG. 7, a user moves the lock member 4, which is in the locking position, up to an unlocking position in front in such a way as to pick grippers 4a, formed in a top and bottom of the lock member 4, with the fingers. At that time, a front edge 26b of the locking opening 26 of the connector main body 3 slidingly contacts relative to an inclined surface 23b formed in an inner side of the elastic locking piece 23, so that the elastic locking piece 23 elastically deforms to the outer side in the radial direction. Thereby, as is the case with an insertion time of the pipe 2, the locking of the protruding portion 28 relative to the back edge 26a of the locking opening 26 is released. Moreover, the locking claw 25 is displaced to an outer side so as to release the locking relative to the bulge portion 27. Incidentally, as is the case with the inclined surface 28b, the inclined surface 23b inclines relative to the insertion direction of the pipe 2. Also, even at a connecting time of the aforementioned pipe 2, the inclined surface 23b functions in the same manner.

Thus, in the above-mentioned connector 1, the elastic locking piece 23 is urged in a locking direction of the pipe 2 in a case wherein the lock member 4 is in the locking position, so that the connected state to the pipe 2 can be solidly held. In that case, there is also an advantage of being unsusceptible to a force in a direction of releasing the fixation of the pipe (i.e., a force moving the lock member 4 forward), which acts relative to the lock member 4, without any relation to an operation by a user.

Figure 8:
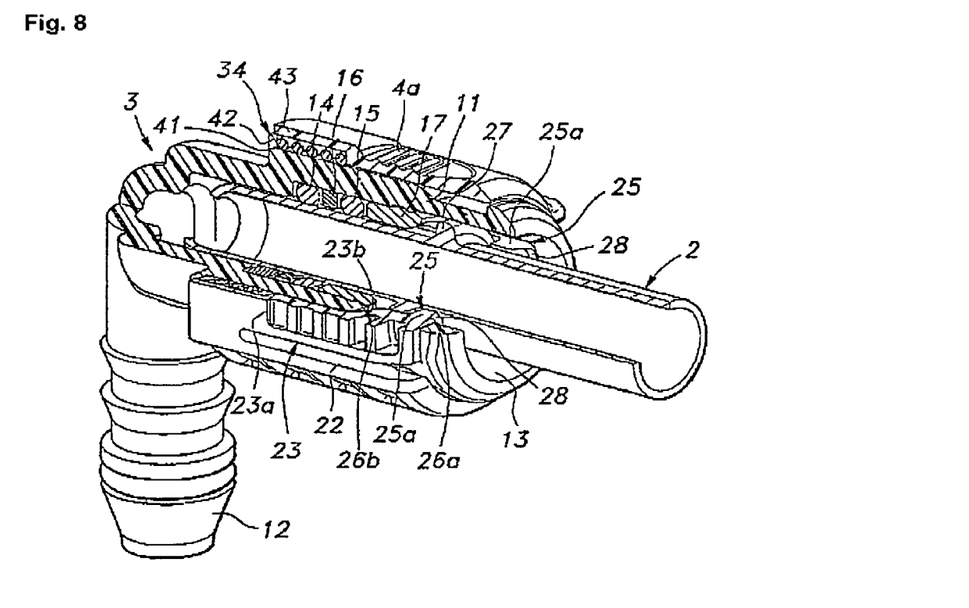
FIG. 8 is a partially cross-sectional perspective view showing a modified example of the pipe connecting connector according to the first embodiment.

Incidentally, as for an urging device urging the lock member 4 to a locking position side, the urging device is not limited to the urging device using the aforementioned elastic urging piece 33 and the protruding piece 34, and various modifications are capable. For example, as shown in FIG. 8, a compression spring 41 interposed between the connector main body 3 and the lock member 4 can be used as the urging device. In that case, in the pipe insertion portion 11 of the connector main body 3, there is provided an annular spring support portion 42 supporting a front end side of the compression spring 41 in place of the protruding piece 34. Also, in a front end side of the lock member 4, there is provided a step portion 43 supporting a back end side of the compression spring 41, and also demarcating a holding space thereof.

<Second Embodiment>

Next, with reference to FIG. 9 to FIG. 13, the pipe connecting connector according to a second embodiment will be explained. In FIG. 9 to FIG. 13, regarding constituent elements similar to the first embodiment, the same reference numerals are assigned. Also, in the second embodiment, regarding items similar to the first embodiment, except for items specially referred hereinafter, detailed explanations are omitted.

Figure 9:
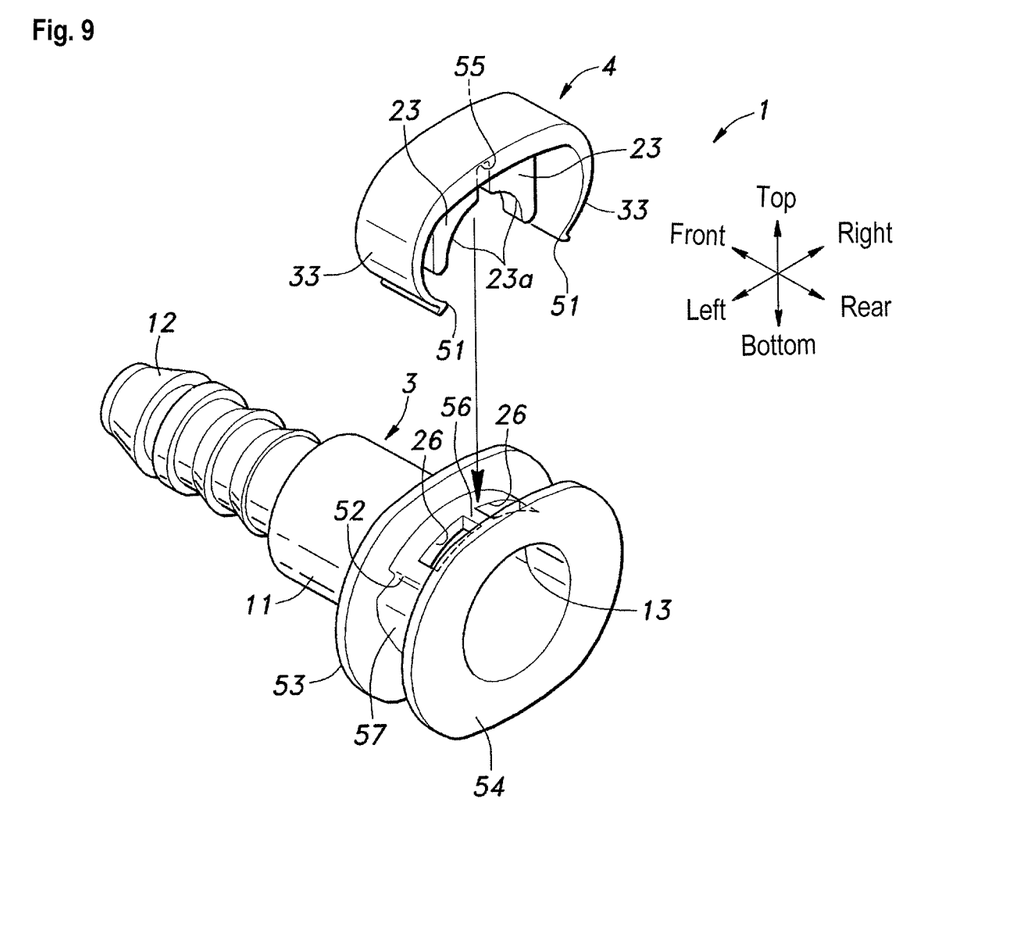
FIG. 9 is an exploded perspective view of the pipe connecting connector according to a second embodiment.

As shown in FIG. 9, the lock member 4 includes a pair of curved arm-like elastic urging pieces 33 respectively extending downward to the right and left from an upper center; and a pair of leg-like locking pieces 23 disposed between the elastic urging pieces 33, and provided to extend downward from the upper center. In free ends of the elastic urging pieces 33, there are respectively formed engagement claws 51. In the second embodiment, the locking pieces 23 have a structure which is difficult to elastically deform. Also, the lock member 4 is held in the connector main body 3 movably in an up-and-down direction, and according to an up-and-down movement thereof, the lock member 4 carries out the fixation and the release of the pipe 2.

Also, in the connector main body 3, there is provided a pair of guide pieces 53 and 54 guiding the up-and-down movement thereof in such a way as to sandwich a front and back of the lock member 4. An attachment portion 57 of the lock member 4 is demarcated by the guide pieces 53 and 54. In a right and left of the attachment portion 57, there are respectively formed engagement concave portions 52. Here, although it is not shown in the figures, in the insertion hole 13 in which the pipe 2 is inserted and removed, as is the case with the first embodiment, there is attached an O-ring and the like for sealing the flow channel tightly.

Next, with reference to FIG. 10 to FIG. 13, a connecting movement of the connector 1 with the aforementioned structure and the pipe 2 will be explained.

Figure 10:
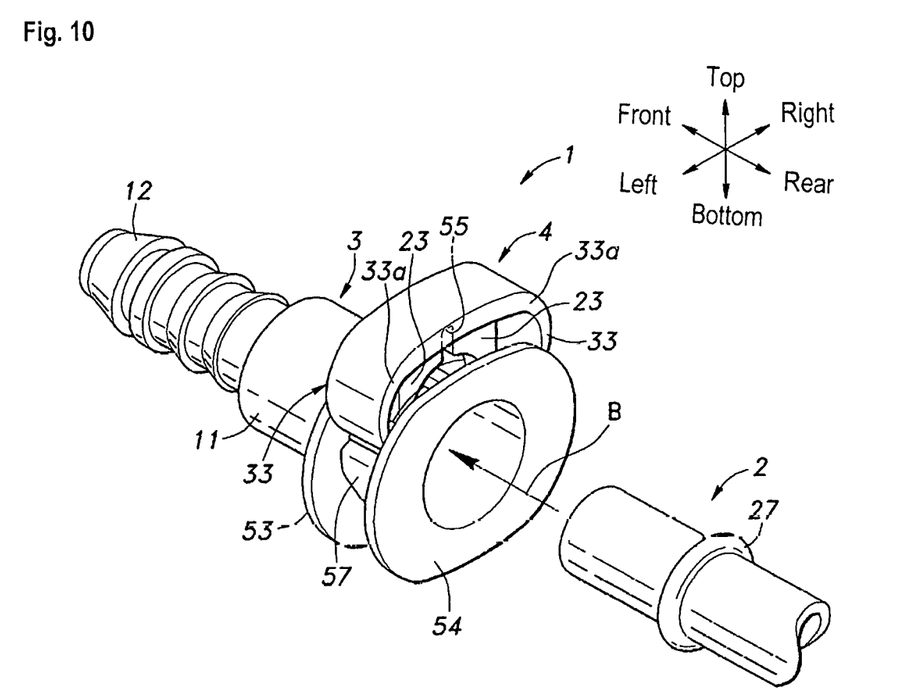
FIG. 10 is a perspective view showing one state (before the connection) in the connecting movement of the pipe connecting connector in FIG. 9.
Figure 11:
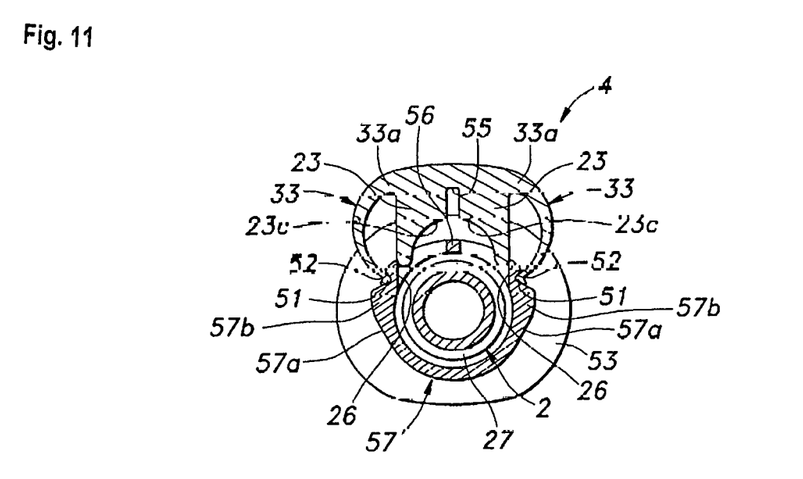
FIG. 11 is a vertically cross-sectional view of essential parts of the pipe connecting connector in FIG. 10.

As shown in FIG. 10 and FIG. 11, in the connector 1 before the pipe 2 is connected, the lock member 4 is in the unlocking position (the initial position) protruding upward from the connector main body 3. At that time, in the elastic urging piece 33, the engagement claw 51 on an end thereof is in a state respectively fitted into the engagement concave portion of the connector main body 3. Also, in that state, the elastic urging piece 33 slightly elastically deforms to an outer side as the supporting point of the base end portion 33a thereof, and by the elastic restoring force thereof, the elastic urging piece 33 clamps the attachment portion 57. Also, in the locking piece 23, an end portion thereof is inserted into a pair of the locking openings 26 formed in an upper portion of the attachment portion 57.

Figure 12:
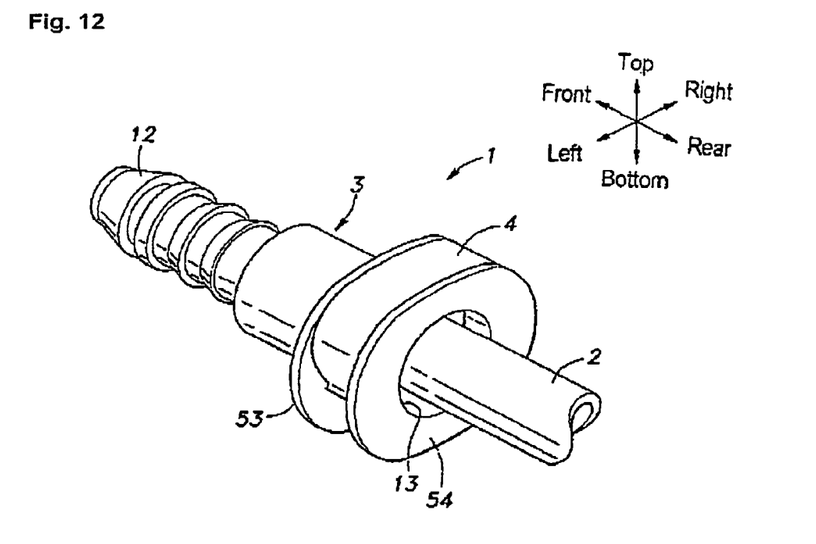
FIG. 12 is a perspective view showing one state (after the completion of the connection) in the connecting movement of the pipe connecting connector in FIG. 9.
Figure 13:
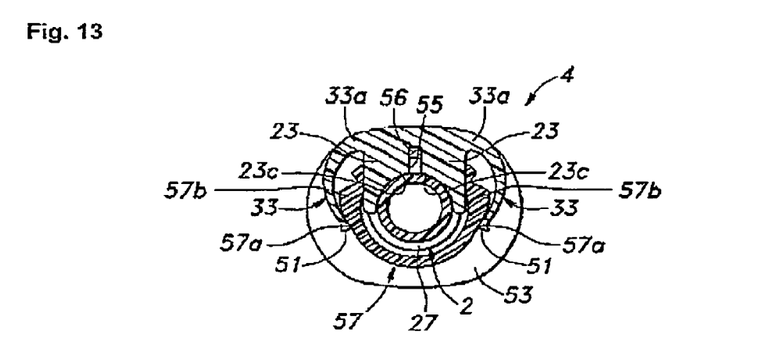
FIG. 13 is a vertically cross-sectional view of the essential parts of the pipe connecting connector in FIG. 12.

Next, after a user inserts the pipe 2 relative to the insertion hole 13 of the connector main body 3 in a direction shown by an arrow B in FIG. 10, as shown in FIG. 12 and FIG. 13, the lock member 4 is pushed downward up to the locking position on a lower side. At that time, the locking piece 23 moves to the back of the bulge portion 27 of the pipe 2, and circular arc portions 23c provided on a lower-end inner side thereof abut against an outer peripheral face of an upper portion of the pipe 2. Also, an attachment bar 56 between the locking openings 26 is fitted and inserted relative to an attachment groove 55 formed between both the locking pieces 23. Thereby, the bulge portion 27 of the pipe 2 is locked by the locking piece 23, and the connection of the pipe 2 relative to the connector 1 is completed.

Also, at that time, the engagement claw 51 of the elastic urging piece 33 comes out of the engagement concave portion 52 of the connector main body 3, and in a state of slidingly contacting with a lower-side outer peripheral face 57a of the attachment portion 57, the engagement claw 51 of the elastic urging piece 33 moves downward. Here, the elastic urging piece 33 elastically deforms in such a way as to further expand to the outer side from a state in FIG. 10 and FIG. 11, and the engagement claw 51 thereof comes to a state of slidingly contacting with a right and left of the lower-side outer peripheral face 57a of the attachment portion 57. The lower-side outer peripheral face 57a is inclined to the inner side toward the center of a lower portion of the attachment portion 57, so that the elastic restoring force (the urging force) of the elastic urging piece 33 is converted to a force displacing the locking member 4 (the locking piece 23) downward (i.e., the direction of locking the pipe 2).

As a result, the locking piece 23 is urged in such a way that the circular arc portion 23c presses the outer peripheral face of the upper portion of the pipe 2, and the connected state of the pipe 2 relative to the connector 1 (i.e., locking of the locking piece 23 relative to the bulge portion 27) is solidly held. In the connected state, in the attachment portion 57 positioned on an upper side of the engagement claw 51, there are provided thickness portions 57b on right-and-left lateral walls. Thereby, the connected state is held more stably.

<Third Embodiment>

Next, with reference to FIG. 14 to FIG. 17, the pipe connecting connector according to a third embodiment will be explained. In FIG. 14 to FIG. 17, regarding constituent elements similar to the first embodiment, the same reference numerals are assigned. Also, in the third embodiment, regarding items similar to the first embodiment, except for items specially referred hereinafter, detailed explanations are omitted.

Figure 14:
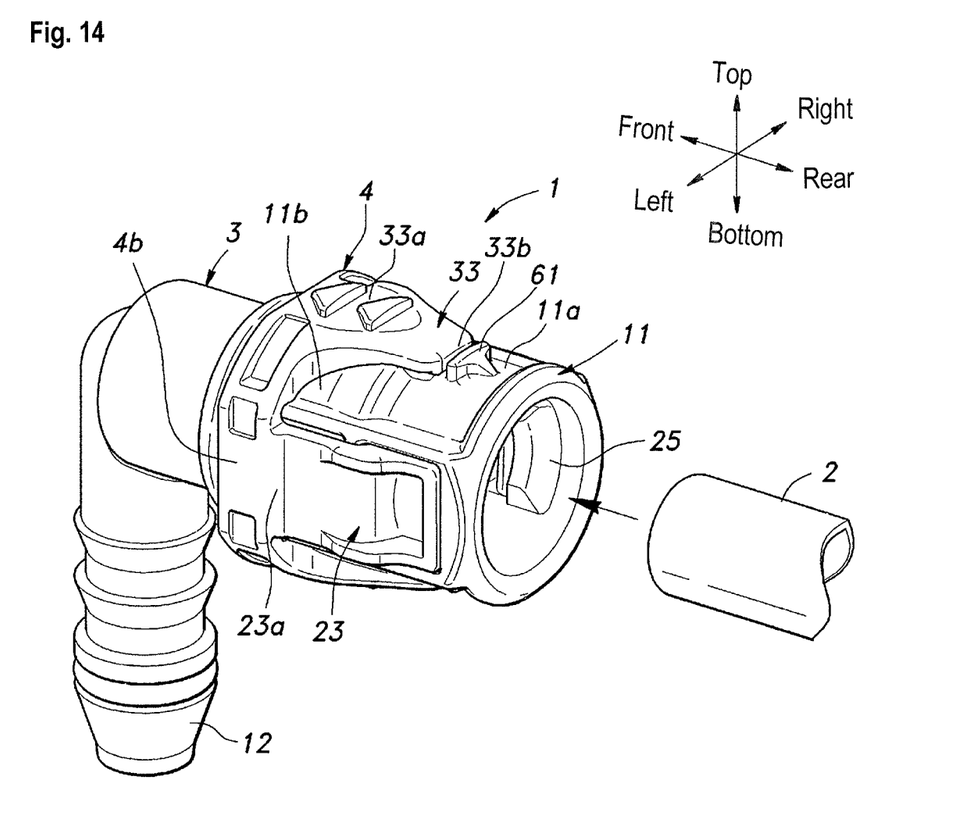
FIG. 14 is a perspective view of the pipe connecting connector according to a third embodiment.
Figure 15:
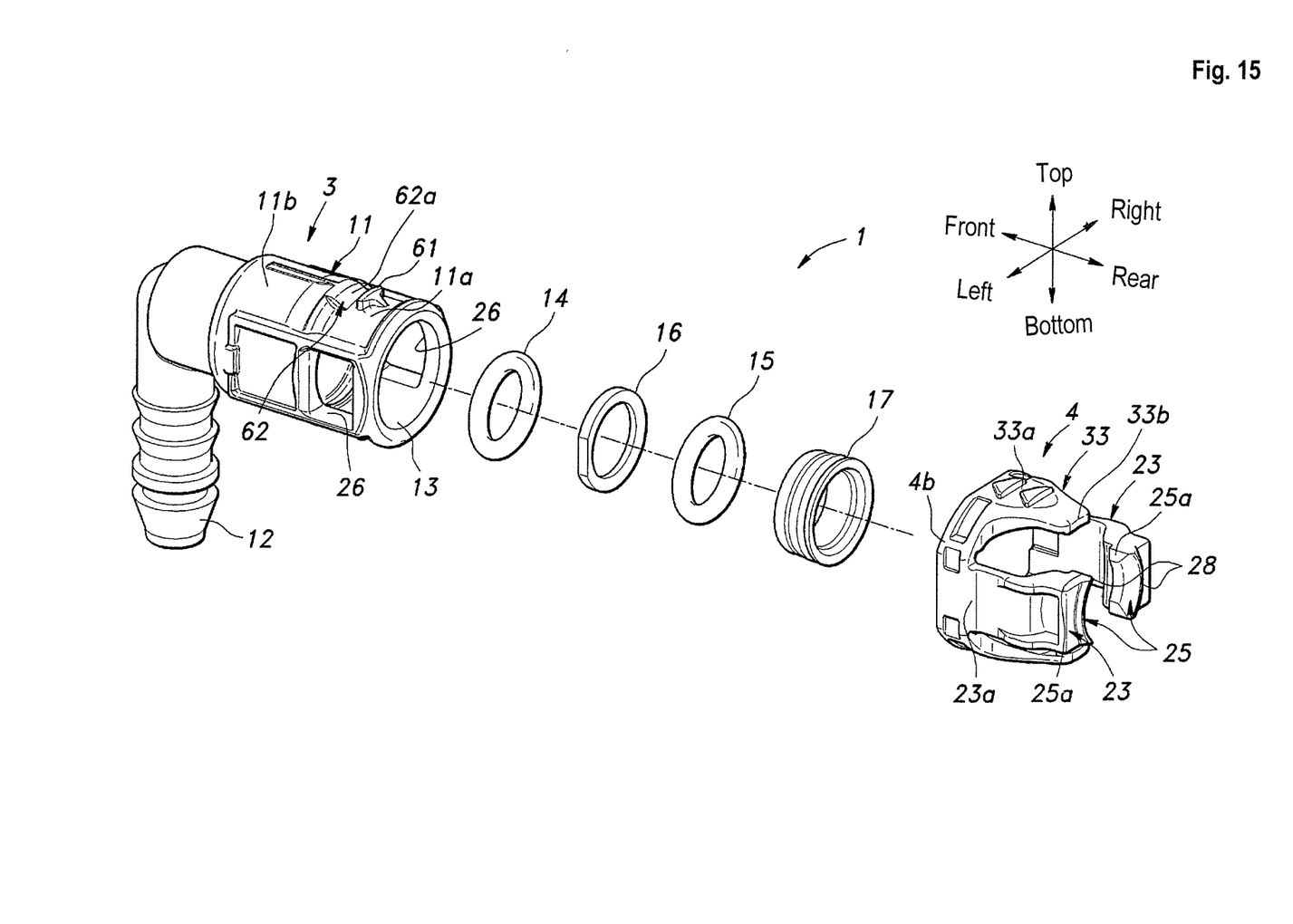
FIG. 15 is an exploded perspective view of the pipe connecting connector in FIG. 14.

As shown in FIG. 14 and FIG. 15, the lock member 4 has a symmetric shape in the top and bottom and in the right and left, and there is provided to protrude a right-and-left pair of elastic locking pieces 23 toward a back from an annular portion 4b on a front end side thereof. As is the case with the first embodiment, the elastic locking piece 23 can elastically deform in such a way as to displace the locking claw 25 in the radial direction (the right-and-left direction) of the lock member 4 as the supporting point of the base end portion 23a in front which continues to the annular portion 4b. Also, in the lock member 4, there is provided to protrude a top-and-bottom pair of elastic urging pieces 33 toward the back from the annular portion 4b. The elastic urging piece 33 can elastically deform in such a way as to displace the free end portion 33b in the radial direction (the up-and-down direction) of the lock member 4 as the supporting point of the base end portion 33a in front which continues to the annular portion 4b.

Figure 16:
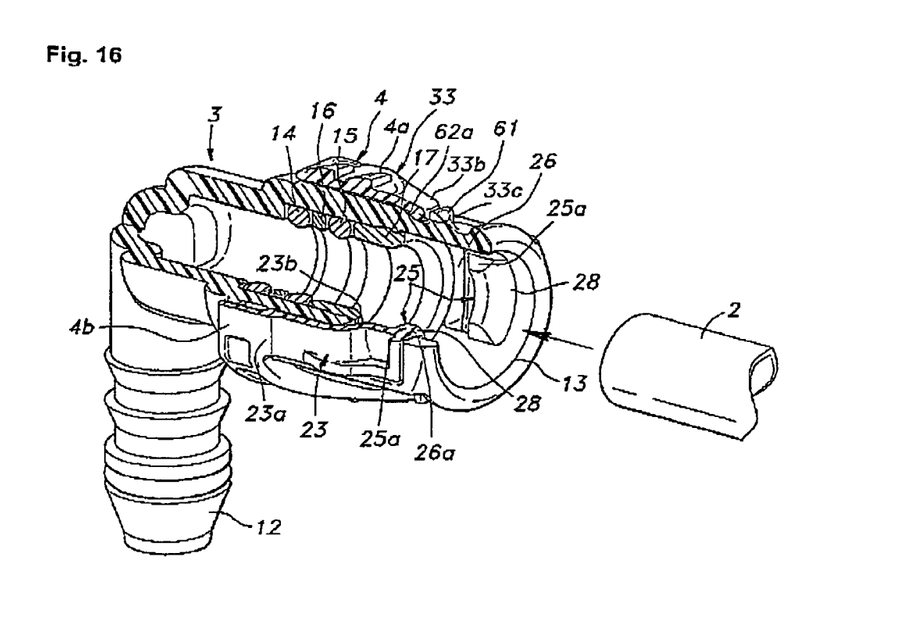
FIG. 16 is a partially cross-sectional perspective view showing one state (before the connection) in the connecting movement of the pipe connecting connector in FIG. 14.

Although details will be explained hereinafter, as shown in FIG. 16, in the elastic urging piece 33, there is provided to protrude a protruding portion 33c toward the inner side (a pipe insertion portion 11 side) in the radial direction from the free end portion 33b thereof. As shown in FIG. 15, upper and lower outer peripheral faces of the pipe insertion portion have a step difference, and a back-side outer peripheral face 11a has a small outer diameter compared to a front-side outer peripheral face 11b. In the back-side outer peripheral face 11a, there is provided a protruding piece 61. In the protruding piece 61, a front face thereof abuts against the free end portion 33b of the elastic urging piece 33 so as to be capable of controlling a backward movement of the elastic urging piece 33. Also, in front of the protruding piece 61, there is provided an inclining platform portion 62 having an inclined surface 62a which continues to the back-side outer peripheral face 11a from the front-side outer peripheral face 11b.

Next, with reference to FIG. 16 and FIG. 17, the connecting movement of the connector 1 with the aforementioned structure and the pipe 2 will be explained.

As shown in FIG. 16, in the connector 1 before the pipe 2 is connected, the lock member 4 is in the initial position. At that time, in the elastic urging piece 33, the free end portion 33b elastically deforms to the outer side in the radial direction, and the protruding portion 33c is in a state of slidingly contacting with the inclined surface 62a. Thereby, the lock member 4 is urged backward by the elastic restoring force (the urging force) of the elastic urging piece 33. Also, in the elastic locking piece 23, the locking claw 25 thereof abuts against the back edge 26a of the locking opening of the connector main body 3, and the protruding portion 28 is locked in the back edge 26a so as to control the displacement of the elastic locking piece 23 to the outer side in the radial direction.

Next, as is the case with the aforementioned FIG. 4, a user inserts the pipe 2 relative to the connector main body 3, so that the lock member 4 moves forward against the urging force of the elastic urging piece 33. Thereby, the locking claw 25 is separated from the back edge 26a of the locking opening 26, and the locking of the protruding portion 28 is released. The locking claw 25 climbs over the bulge portion 27 while being displaced to the outer side in the radial direction, and moves to the back thereof.

Figure 17:
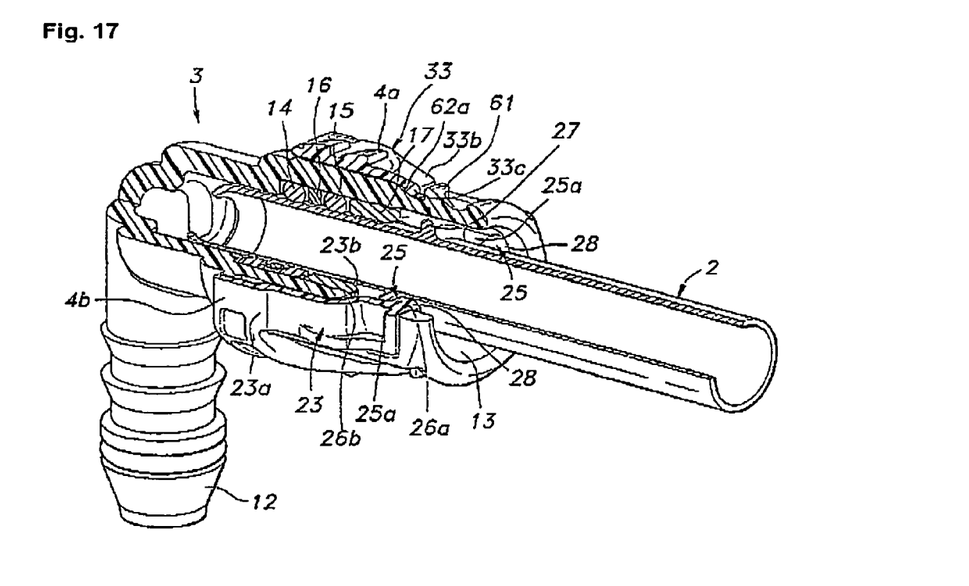
FIG. 17 is a partially cross-sectional perspective view showing one state (after the completion of the connection) in the connecting movement of the pipe connecting connector in FIG. 14.

After that, as shown in FIG. 17, the lock member 4 returns to the locking position (the same position as the aforementioned initial position), and the bulge portion 27 of the pipe 2 is locked by the locking claw 25, so that the connection of the pipe 2 relative to the connector 1 is completed. At that time, as is the case with the first embodiment, the elastic restoring force (the urging force) of the elastic urging piece 33 is converted to the force displacing the locking member 4 (the locking piece 23) downward (i.e., the direction of locking the pipe 2). As a result, as described hereinabove regarding FIG. 6, the locking claw 25 is urged in such a way that the protruding portion 28 thereof enters into the front inner side of the back edge 26a of the locking opening 26.

Namely, the locking of the locking claw 25 relative to the bulge portion 27 is solidly held.

Also, as described hereinabove regarding FIG. 7, when the connected state of the pipe 2 relative to the connector 1 is released, a user moves the lock member 4, which is in the locking position, up to the unlocking position in front in such a way as to pick the grippers 4a, formed in the top and bottom of the lock member 4, with the fingers. Thereby, the locking of the protruding portion 28 relative to the back edge 26a of the locking opening 26 is released. Moreover, the locking of the locking claw 25 relative to the bulge portion 27 is released.

Thus, even in the connector 1 according to the third embodiment, the elastic locking piece 23 is urged in the locking direction of the pipe 2 in the case wherein the lock member 4 is in the locking position, so that the connected state to the pipe 2 can be solidly held.

Although the present invention has been explained in detail based on the specific embodiments, those embodiments are absolutely illustrated as an example, and the present invention is not limited to those embodiments. For example, the connecting object of the pipe is not limited to the hose which is connected to the hose connecting portion as mentioned above, and according to circumstances, without providing the hose connecting portion, the connector main body may be provided as one portion of a housing and the like of a device which can be the connecting object of the pipe. Also, all of each constituent element of the pipe connecting connector according to the present invention shown in the aforementioned embodiments is not necessarily essential, and can be selectively used provided that at least it does not exceed the scope of the present invention.

EXPLANATION OF SYMBOLS 1 a pipe connecting connector
2 a pipe
3 a connector main body
4 a lock member
23 (elastic) locking pieces (pipe locking portions)
25 locking claws
26a back edges (slidingly-contacting portions)
26b front edges
27 a bulge portion
28 protruding portions
28b inclined surfaces (guide faces)
33 elastic urging pieces (urging devices)
34 a protruding piece
41 a compression spring (an urging device)
51 engagement claws (slidingly-contacting portions)
52 engagement concave portions
53 a guide piece
57 an attachment portion
57a lower-side outer peripheral faces (guide faces)

What is claimed is:

1. A pipe connecting connector adapted to connect a pipe to a connecting object, comprising:
    a connector main body adapted to insert or remove the pipe, and including a locking opening formed on a side portion thereof and an insertion hole at a rear end thereof for inserting the pipe; and
    a lock member including
        an annular portion slidably disposed over the connector main body,
        an urging device extending from the annular portion along an upper side portion of the connector main body in an axial direction of the connector main body,
        another urging device extending from the annular portion toward the rear end of the connector main body along a lower side portion of the connector main body opposite to the upper side portion of the connector main body in respect to the insertion hole,
        a pipe locking portion extending from the annular portion along the side portion of the connector main body in the axial direction, and
        another pipe locking portion extending from the annular portion toward the rear end of the connector main body along another side portion of the connector main body opposite to the side portion in respect to the insertion hole,
        the pipe locking portion including a locking claw extending inside the connector main body through the locking opening for locking the pipe,
        the lock member being movably held relative to the connector main body between a locking position wherein the pipe locking portion locks the pipe, and an unlocking position releasing the locking;
    wherein the urging device urges the lock member to slide to a locking position side so that the pipe locking portion is urged in a locking direction of the pipe and the locking claw is urged inwardly toward the pipe by an urging force of the urging device when the lock member is in the locking position, and
    the annular portion of the lock member is slidably disposed over the connector main body at a position adjacent to a front end of the connector main body, the pipe locking portion and the urging device extending from the annular portion toward the rear end of the connector main body in the axial direction.

2. A pipe connecting connector according to claim 1, wherein one of either the connector main body or the lock member is formed with a guide face, and the other is formed with a slidingly-contacting portion slidingly contacting with the guide face when the lock member moves, and
    the slidingly-contacting portion moves on the guide face by the urging force of the urging device, so that the pipe locking portion is guided in the locking direction of the pipe.

3. A pipe connecting connector according to claim 2, wherein the urging device is made by an elastic urging piece which elastically deforms by abutting against the connector main body and generates the urging force.

4. A pipe connecting connector according to claim 2, wherein the pipe locking portion is made to be capable of elastically deforming by an engagement with the connector main body, and one of either the slidingly-contacting portion or the guide face is provided in the pipe locking portion.

5. A pipe connecting connector according to claim 1, wherein the lock member is integrally formed with the annular portion, the pipe locking portion, and the locking claw as one member.

6. A pipe connecting connector according to claim 5, wherein the locking claw includes a protruding portion having an inclined surface inclined toward an inside of the connector main body and a guide face inclined toward an outside of the connector main body for guiding the pipe locking portion in the locking direction of the pipe, and
    the connector main body includes a slidingly-contacting portion at an edge of the locking opening to slidingly contact the guide face, so that when the pipe locking portion is urged by the urging force of the urging device, the guide face slides along the slidingly-contacting portion and guides the pipe locking portion in the locking direction of the pipe.

7. A pipe connecting connector according to claim 6, wherein the lock member is arranged so that when the lock member is in the locking position, the pipe locking portion is urged in the locking direction of the pipe by the urging force of the urging device and the locking claw extends through the locking opening of the connector main body to lock the pipe, and when the lock member is moved from the locking position to the unlocking position, the pipe locking portion is moved against the urging force of the urging device and the locking claw moves away from the pipe to unlock the pipe.

8. A pipe connecting connector according to claim 1, wherein the urging device further comprises a gripper protruding from an outer surface thereof and being gripped to move the lock member toward the unlocking position to release the pipe.

9. A pipe connecting connector according to claim 8, wherein the connector main body further includes a protruding piece protruding from the upper side portion of the connector main body to control a movement of the urging device, and an inclining platform portion having an inclined surface; and
  the lock member is arranged such that when the lock member is in the locking position, the urging device contacts the inclining platform portion of the connector main body to urge the lock member toward the protruding piece of the connector main body so that the urging device abuts against the protruding piece, and when the lock member is moved from the locking position to the unlocking position, the gripper is gripped to move the urging device of the lock member away from the protruding piece of the connector main body.

10. A pipe connecting connector according to claim 9, wherein the locking claw includes a protruding portion having an inclined surface inclined toward an inside of the connector main body and a guide face inclined toward an outside of the connector main body for guiding the pipe locking portion in the locking direction of the pipe, and
  the connector main body includes a slidingly-contacting portion at an edge of the locking opening to slidingly contact the guide face, so that when the pipe locking portion is urged by the urging force of the urging device, the guide face slides along the slidingly-contacting portion and guides the pipe locking portion in the locking direction of the pipe.

11. A pipe connecting connector adapted to connect a pipe to a connecting object, comprising:
  a connector main body adapted to insert or remove the pipe, and including a locking opening formed on a side portion thereof;
  a lock member including an annular portion slidably disposed over the connector main body, and a pipe locking portion extending from the annular portion along the side portion of the connector main body, the pipe locking portion including a locking claw extending inside the connector main body through the locking opening for locking the pipe, the lock member being movably held relative to the connector main body between a locking position wherein the pipe locking portion locks the pipe, and an unlocking position releasing the locking; and
  an urging device urging the lock member to a locking position side,
  wherein the pipe locking portion is urged in a locking direction of the pipe by an urging force of the urging device when the lock member is in the locking position,
  the lock member is integrally formed with the annular portion, the pipe locking portion, and the locking claw as one member,
  the locking claw includes a protruding portion having an inclined surface inclined toward an inside of the connector main body and a guide face inclined toward an outside of the connector main body for guiding the pipe locking portion in the locking direction of the pipe,
  the connector main body includes a slidingly-contacting portion at an edge of the locking opening to slidingly contact the guide face, so that when the pipe locking portion is urged by the urging force of the urging device, the guide face slides along the slidingly-contacting portion and guides the pipe locking portion in the locking direction of the pipe,
  the lock member is arranged so that when the lock member is in the locking position, the pipe locking portion is urged in the locking direction of the pipe by the urging force of the urging device and the locking claw extends through the locking opening of the connector main body to lock the pipe, and when the lock member is moved from the locking position to the unlocking position, the pipe locking portion is moved against the urging force of the urging device and the locking claw moves away from the pipe to unlock the pipe,
  the urging device is an elastic urging piece formed on the lock member extending along the connector main body in a direction same as the pipe locking portion;
  the connector main body further includes a protruding piece protruding in a radial direction of the connector main body to control a movement of the elastic urging piece, and an inclining platform portion having an inclined surface; and
  the lock member is arranged such that when the lock member is in the locking position, the elastic urging piece of the lock member contacts the inclining platform portion of the connector main body to urge the lock member toward the protruding piece of the connector main body so that the elastic urging piece abuts against the protruding piece, and when the lock member is moved from the locking position to the unlocking position, the elastic urging piece of the lock member is moved away from the protruding piece of the connector main body and is elastically deformed in the radial direction.

* * * * *